US008915260B2

(12) United States Patent  
Klein et al.

(10) Patent No.: US 8,915,260 B2
(45) Date of Patent: Dec. 23, 2014

(54) FORCE TRANSFERRING PRESSURE RELIEF DEVICE

(75) Inventors: Greg Klein, Owasso, OK (US); Charlie Beair, Tulsa, OK (US); Joseph P. Kelly, Houston, TX (US); Geof Brazier, Woodbury, MN (US)

(73) Assignee: BS&B Safety Systems, Limited, Limerick (IE)

( * ) Notice: Subject to any disclaimer, the term of this patent is extended or adjusted under 35 U.S.C. 154(b) by 510 days.

(21) Appl. No.: 11/221,856

(22) Filed: Sep. 9, 2005

(65) Prior Publication Data

US 2007/0056629 A1  Mar. 15, 2007

(51) Int. Cl.
  *F16K 17/40* (2006.01)
  *F16K 17/14* (2006.01)
  *F16K 25/04* (2006.01)
  *F16K 15/06* (2006.01)

(52) U.S. Cl.
  CPC .............. *F16K 17/406* (2013.01); *F16K 15/06* (2013.01)
  USPC ........................ 137/68.11; 137/15.19; 251/86

(58) Field of Classification Search
  USPC .................. 137/15.18, 15.19, 68.11, 315.04; 251/86
  See application file for complete search history.

(56) References Cited

U.S. PATENT DOCUMENTS

| | | | | |
|---|---|---|---|---|
| 3,511,270 | A * | 5/1970 | Muller et al. | 137/510 |
| 3,810,484 | A * | 5/1974 | Martini | 137/70 |
| 3,872,875 | A * | 3/1975 | Raidl, Jr. | 137/71 |
| 4,201,366 | A * | 5/1980 | Danko et al. | 251/335.3 |
| 4,274,435 | A * | 6/1981 | Block | 137/508 |
| 4,722,360 | A * | 2/1988 | Odajima et al. | 137/487.5 |
| 5,144,973 | A * | 9/1992 | Green et al. | 137/71 |
| 5,273,065 | A * | 12/1993 | Taylor | 137/70 |
| 5,511,581 | A | 4/1996 | Ligh | |
| 5,577,524 | A * | 11/1996 | Taylor | 137/70 |
| 5,727,586 | A * | 3/1998 | Taylor | 137/68.11 |
| 5,738,333 | A * | 4/1998 | Cognevich et al. | 251/61.2 |
| 6,173,736 | B1 * | 1/2001 | Ligh | 137/494 |
| 6,276,389 | B1 * | 8/2001 | Taylor | 137/68.11 |
| 6,325,088 | B1 * | 12/2001 | Scantlin | 137/70 |
| 6,341,616 | B1 * | 1/2002 | Taylor | 137/68.12 |
| 6,488,260 | B1 * | 12/2002 | Dietz | 251/129.13 |
| 6,668,853 | B2 * | 12/2003 | Dean | 137/315.04 |
| 2004/0154466 | A1 * | 8/2004 | Gethmann et al. | 92/5 R |
| 2005/0040284 | A1 * | 2/2005 | Christensen et al. | 244/101 |
| 2005/0236594 | A1 * | 10/2005 | Lilly et al. | 251/129.03 |

FOREIGN PATENT DOCUMENTS

EP  0 798 483 A1  10/1997

OTHER PUBLICATIONS

International search report from PCT/US2006/034006 dated Jan. 15, 2007 (5 pages).

* cited by examiner

*Primary Examiner* — Atif Chaudry
(74) *Attorney, Agent, or Firm* — Finnegan, Henderson, Farabow, Garrett and Dunner LLP (57) ABSTRACT

A pressure relief device is disclosed for a system containing a pressurized fluid. The device includes a main valve body having inlet and outlet flow ports and a valve plug positioned to seal the flowpath of the pressurized fluid between the inlet port and the outlet port of main valve body. A force transmission component is connected to the valve plug and an activation component is installed between the force transmission component and a mounting surface. The activation component is configured to prevent axial movement of the valve plug until a predetermined pressure is exerted on the valve plug. The force transmission component more efficiently transfers the output force acting on the valve plug to the activation component.

46 Claims, 9 Drawing Sheets

FORCE TRANSFERRING PRESSURE RELIEF DEVICE

FIELD OF THE INVENTION

This invention generally relates to systems for relieving pressure from a pressurized system. More particularly, the present invention relates to a pressure relief apparatus for a system containing a pressurized fluid.

BACKGROUND OF THE INVENTION

There are many types of systems that process, transport, or use a pressurized fluid. To ensure the safety of these types of systems, each such system typically includes a safety device designed to prevent the over-pressurization of the system. In an emergency situation, where the fluid in the system reaches an unsafe level, the pressure of the fluid acts on the safety device to create an opening to release fluid from the system. Venting fluid to the environment or a safety reservoir through the opening reduces the pressure in the system and prevents another portion of the system from failing due to the high pressure of the fluid.

Examples of commonly used safety devices include rupture disks and explosion panels. These safety devices can be attached to a pressurized system to expose a certain portion of the device to the pressurized fluid in the system. The portion of the device exposed to the fluid is configured to rupture or tear when the fluid reaches a predetermined pressure. The tearing or rupture of the disk or panel creates an opening through which the pressurized fluid flows to reduce the pressure in the system. This type of safety device is, therefore, self-destructing and must be replaced after each use. Typically, to replace one of these safety devices, some disassembly of the system is needed so that the disk or panel can be properly engaged with the system.

Another type of safety device for a pressurized system is a pressure relief valve, which may be a reclosing valve or a non-reclosing valve. Typically, a spring, a pin, or a combination of a spring and pin, is used to hold a moving plug in sealing engagement with the housing of the device while connected to the pressurized system. When the pressure of the fluid reaches the predetermined safety level in such systems, the force exerted on the plug by the pressurized fluid overcomes the bias of the spring or exceeds the resistance of the pin that holds the plug in place. When either of these events occurs, the pressurized fluid moves the plug to expose an opening through which fluid may escape to relieve the pressure in the system. Reclosing valves will automatically reset once the pressurized fluid at the inlet of the device has reduced sufficiently for the spring or other mechanism to reseat the plug. Non-reclosing valves require that the device be manually reset so that the valve plug is re-engaged with the seal and, if necessary, the pin or other expendable component replaced.

As noted above, relief valves are known that use buckling pins, or breaking pins, to hold a sealing plug in sealing engagement to block the flow of a pressurized fluid. The pin release device prevents the plug from venting pressurized fluid until the output force exceeds a predetermined limit. Prior release devices have included a pin that is subject to a compressive force and that buckles according to Euler's Law when the output force reaches the predetermined limit or a shearing or tensile force that causes the breaking of the pin when the output force reaches the predetermined limit. Such a device is typically termed a "Buckling Pin Non Reclosing Pressure Relief Device."

Buckling pins are carefully manufactured components configured to buckle at a particular predetermined compressive force. Breaking pins are carefully manufactured components configured to fail at a particular predetermined tensile or shear force. Such pins used for a pressure relief valve require considerable care and control during installation. Maintenance personnel must ensure that the pin is properly secured and tightened to properly bear the pressure exerted on the pressure relief valve. Failure to do so may result in untimely opening of the valve. A premature opening below the predetermined safety level leads to an unwanted downtime for the system, while a delayed opening above the predetermined safety level jeopardizes the physical integrity of the system. Another problem with a bare pin is that there is a risk of pin damage stemming from maintenance personnel having to contact the bare pin during installation or maintenance. This risk of pin damage is especially high for a fragile, low pressure bare pin.

As noted above, it order to properly function as a safety pressure relief device, it is important that the relief device vents at, or close to, the set pressure. Since buckling pins are designed to buckle at a predetermined compressive force, a pressure relief system must assure that force from the pressurized system is efficiently transferred to the buckling pin. In prior devices, forces from the pressurized system are often improperly transferred through the pressure relief device's structural system such that the compressive force experienced by the buckling pin is not an accurate representation of the actual force transmitted by the pressurized system. For example, forces transferred to the buckling pin from the pressurized system are often lost due to bending, friction between moving parts, and moments generated along the path of transmitted force.

In some pressure relief devices, and particularly those having a low set pressure, mishandling and improper installation of the underlying buckling pin can interfere with the accuracy of the set pressure of the device. For example, buckling pins can be dangerously overloaded during the pre-assembly and installation process such that the pin activates at a much lower pressure than desired during use.

In light of the foregoing, there is a need for a pressure relief apparatus that (1) efficiently and accurately transfers force between the pressurized fluid and the buckling pin, (2) assures that pins are not overloaded during the pre-assembly and installation process, and (3) can provide for resistance to back pressure while maintaining proper positive pressure venting as a pressure relief device.

SUMMARY OF THE INVENTION

Embodiments of the present invention are directed to an improved pressure relief device for a system containing a pressurized fluid that obviates one or more of the limitations and disadvantages of prior pressure relief devices.

In one embodiment, a pressure relief device comprises a main valve body including an axial passageway defining an inlet port, an outlet port, and a fluid flowpath between the inlet and outlet ports. A valve plug is positioned to seal the flowpath of the pressurized fluid between the inlet port and the outlet port of main valve body and a force transmission component is connected to the valve plug. An activation component is installed between the force transmission component and a mounting surface and wherein the activation component is configured to prevent axial movement of the valve until a predetermined pressure is exerted on the valve. The force transmission component only transfers an axial force acting on the valve plug to the activation component.

In another embodiment, a pressure relief device comprises a main valve body including an axial passageway defining an inlet port, an outlet port, and a fluid flowpath between the inlet and outlet ports. A valve plug is positioned to seal the flowpath of the pressurized fluid between the inlet port and the outlet port of main valve body. A force transmission component is connected to the valve plug and an activation component is installed between the force transmission component and a mounting surface such that the activation component is configured to prevent axial movement of the valve seal until a predetermined pressure is exerted on the valve plug. The force transmission component is incapable of transferring any moment resulting from the output force acting on the valve plug to the activation component.

Another embodiment is directed to a method of installing a pressure relief device. The method comprises providing a main valve body including an axial passageway defining an inlet port, an outlet port, and a fluid flowpath between the inlet and outlet ports. The method further comprises providing a valve plug, a force transmission component connected to the valve seal, a mounting surface, and an activation component. The valve plug is positioned to seal the flowpath of the pressurized fluid between the inlet port and the outlet port of main valve body. The method further comprises installing the force transmission component such that only an axial component of output force acting on the valve plug can be transferred therealong and installing an activation component between the force transmission component and the mounting surface such that the activation component is configured to prevent axial movement of the valve plug until a predetermined pressure is exerted on the valve plug.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to exemplary embodiments illustrated in the accompanying drawings. Wherever possible, the same reference numbers will be used throughout the drawings to refer to the same or like parts.

In accordance with the present invention, there is provided a pressure relief apparatus for a system containing a pressurized fluid. The pressure relief apparatus includes a valve having a body that defines a fluid flow path. The body is engageable with the pressurized system to direct pressurized fluid through the flow path. Preferably, the body includes a flange that has a series of bolt holes corresponding to the standard bolt pattern on a pipe flange to allow the body to be easily engaged with the pressurized system. However, it is contemplated that the pressure relief apparatus may be engaged with the pressurized system in any other manner readily apparent to one skilled in the art.

Figure 1:
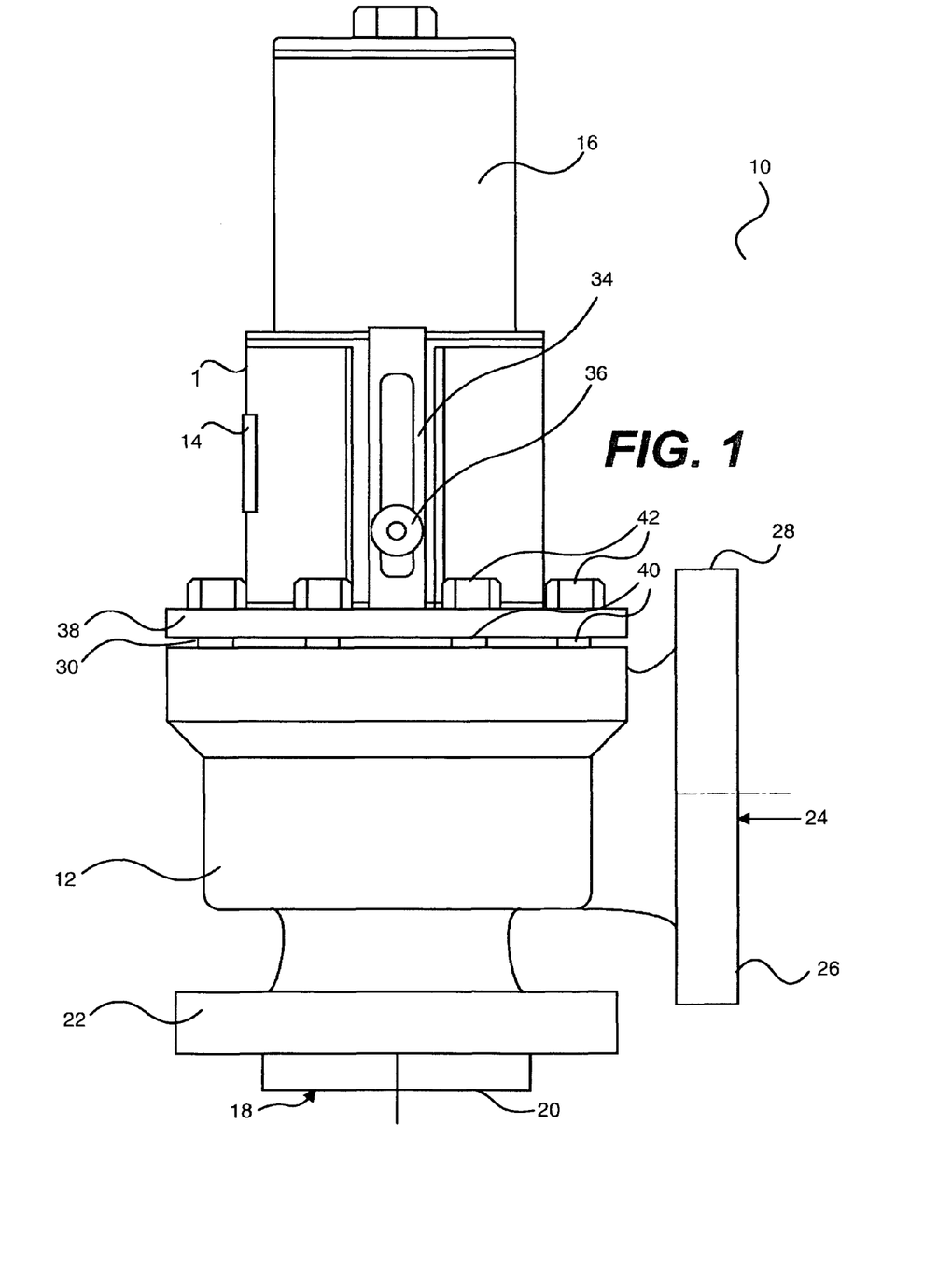
FIG. 1 is a side view of a pressure relief device for a pressurized system according to an exemplary embodiment.

FIG. 1 illustrates a side view of a pressure relief device for a pressurized system according to an exemplary embodiment. FIG. 1 illustrates a pressure relief apparatus 10 including a main valve body 12, a bonnet assembly enclosure 14, and a cap weldment 16. Main valve body 12 includes an axial bore 18 forming an inlet port 20 configured for engagement with a corresponding pipe flange that is connected to a pressurized system (not shown). For example, main valve body 12 can include an inlet flange 22 that contains a series of bolt holes (not shown) positioned in flange 22 to conform to the standard ANSI bolt pattern (or other standardized bolt pattern) for a pipe flange with a similar nominal size. Bolts, or other connecting devices, may be used to engage inlet flange 22 with a corresponding pipe flange that is connected to a pressurized system (not shown). This structure allows for utilization of the entire ANSI standard bolt pattern when installing the valve and is, therefore, preferable over prior art designs wherein this was not practical.

Main valve body 12 further includes a lateral bore 24 intersecting the axial bore 18 and forming an outlet port 26, configured for connection to the environment or a safety reservoir for venting a pressurized fluid. The lateral bore 24 may be formed at a 90 degree angle with regard to the flow path of the inlet bore. For example, main valve body 12 can include an outlet flange 28 configured for connecting the flow path to a safety reservoir, a discharge path, or the environment. Upstream along the flow path that begins at inlet port 20, main valve body 12 includes a downstream port interface 30.

The downstream port interface 30 comprises an opening 32 (see FIG. 2A) that allows for connection to the bonnet assembly 14, which is configured to house and seat a valve sealing interface. As will be described more fully herein below, a valve plug is positioned to close the flow path of the pressurized system between the inlet port 20 and the outlet port 26 of main valve body 12. As noted above, when the pressure of the fluid reaches a predetermined safety level, the force exerted on the valve plug, or plug, by the pressurized fluid overcomes the bias of a spring 87 (see FIG. 5) or exceeds the resistance of a pin that holds the plug in place. When either of these events occurs, the pressurized fluid moves the valve seal, or plug, to expose an opening through which fluid may escape to relieve the pressure in the system.

The bonnet assembly 14 encloses moveable components of the pressure relief apparatus 10 that provide for a valve sealing interface. In addition, the bonnet assembly 14 includes an axial sensor mount 34 for adjustably mounting a position sensor 36 at a location along the exterior surface of the bonnet assembly. The bonnet assembly 14 connects to the main valve body 12 over the downstream port interface 30, for example, through a bonnet assembly flange 38. The bonnet assembly flange 38 can connect to the main valve body 12 through a series of bolts 40 and nuts 42 received in bolt holes formed in the flange 38. The use of a flange connection is considered to be a non-limiting example, and other appropriate connections could be used. A top portion of the bonnet assembly 14 is further enclosed by a removable cap weldment 16. As will be described more fully herein below, cap weldment 16 encloses the portion of the pressure relief device 10 housing an activation component. As an alternative to welding, cap 16 could be a cylinder with an end plate threaded in place. The engagement of cap 16 to the remainder of the system can be accomplished with or without an additional element providing a soft seal, such as a rubber or graphite gasket, to optimize leak tightness.

Figure 2A:
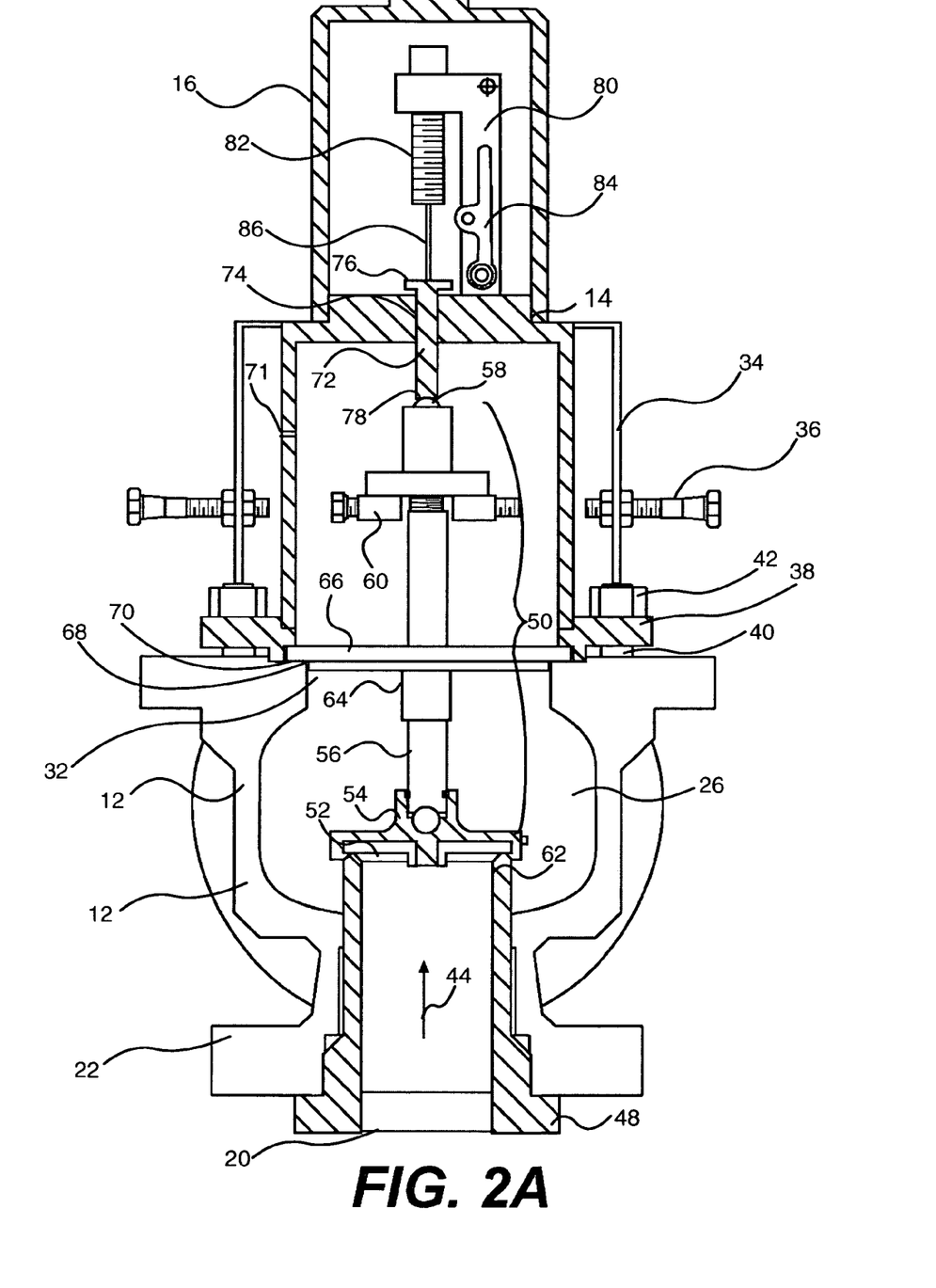
FIG. 2A is a general cross-sectional view of a pressure relief device for a pressurized system according to an exemplary embodiment.

Referring to FIG. 2A, a general cross-sectional view of a pressure relief device is illustrated. As will be apparent, the pressure relief device 10, of FIG. 1 has been rotated 90 degrees such that the outlet port 26 and the outlet flange 28 are directed into the page. As seen in FIG. 2A, a flow path 44 beginning at the inlet port 20 is constituted by a nozzle 48 surrounded by the inlet flange 22 of main valve body 12. The bonnet assembly 14 is mounted such that it encloses moveable components of the pressure relief apparatus 10 that provide for a valve sealing interface.

The valve sealing interface includes a stem assembly 50. Stem assembly 50 comprises a moving valve seat or plug 52, a gimballing joint 54, and a force transmission shaft 56 extending to a protrusion member 58. Protrusion member 58 is a spherical or other curved surface that allows a point contact with an adjacent flat surface, thereby delivering an axial force to an opposing surface (such as, for example, an opposing base surface 78 of a piston 72 as will be described in more detail below). Protrusion member 58 could, for example, be a ball bearing inserted into the end of stem assembly 50 or a surface machined directly to the end of the stem assembly. In addition, the stem assembly 50 may further include a sensor device 60 housed along shaft 56. The gimballing joint 54 rotatably connects the valve plug 52, which closes the flow path 44 upon a sealing connection at a mouth 62 of nozzle 48 to the remainder of the stem assembly 50. The stem assembly 50, in turn, is freely, slidably housed within a central through bore/shaft bushing 64 of a plate member 66. Plate member 66 is formed to exhibit an annular shoulder 68 that cooperates with a reduced step portion 70 along the opening 32 of downstream port interface 30. Accordingly, plate member 66 is dimensioned in order for the annular shoulder 68 to cooperate with the reduced step portion 70 such that plate member 66 concentrically houses the stem assembly 50 therein. In addition, the plate member 66 is also dimensioned to be sealingly engaged between the main valve body 12 and the bonnet assembly enclosure 14 upon the application of nuts 42 and bolts 40 through the bonnet assembly flange 38.

As seen in FIG. 2A, the plate member 66 houses the stem assembly 50 such that the valve plug 52 is aligned to close the flow path 44 by sealingly engaging mouth 62 of nozzle 48. Valve plug 52, as illustrated in FIG. 2A, comprises a moving valve seat disk providing a face seal at the mouth 62 of nozzle 48. It is to be understood that the illustrated face seal between the valve plug 52 and the valve mouth 62 of the flow path 44 is merely exemplary, and the sealed closure of flow path 44 can be achieved through alternative seals or plug configurations as would be apparent to one having ordinary skill in the art. For example, valve plug 52 could comprise a plug structure sealingly engaged within the nozzle 48 using a perimeter "O" ring seal. In addition, the valve plug 52 may have alternative configurations, including a single plate design or a multiple plate design. Alternatively the nozzle 48 could be omitted and the valve plug 52 designed to seat directly into a mating surface prepared in the internal body 12 of the valve.

In some situations the plug 52 can experience a back pressure from the direction of outlet port 26 and acting in a direction opposite the flow path 44. In order to avoid any unwanted influence of a back pressure on the valve plug 52, both the plate member 66 and the bonnet assembly 14 may include one or more apertures 71 therein forming a vent path to the outside environment.

With continued reference to FIG. 2A, the movable components comprising a valve sealing interface further include a piston pin 72 slidably housed within a throughbore 74 along a top surface of the bonnet assembly enclosure 14. The piston pin 72 includes a platform 76 at one end and a base surface 78 along the opposite end. The top surface of the bonnet assembly enclosure 14 includes a mounting block 80, which houses a mounting surface, such as adjuster screw 82, in opposed relation to the piston pin 72, and a pre-loading mechanism 84, to be described more fully in detail below. An activation component, such as, for example, a buckling pin 86, is configured for placement between adjuster screw 82 and the piston pin platform 76. It may be desirable for the buckling pin 86 to insert into an appropriately dimensioned recess in both the adjuster screw 82 and the piston platform 76 in order to achieve proper alignment.

Figure 5:
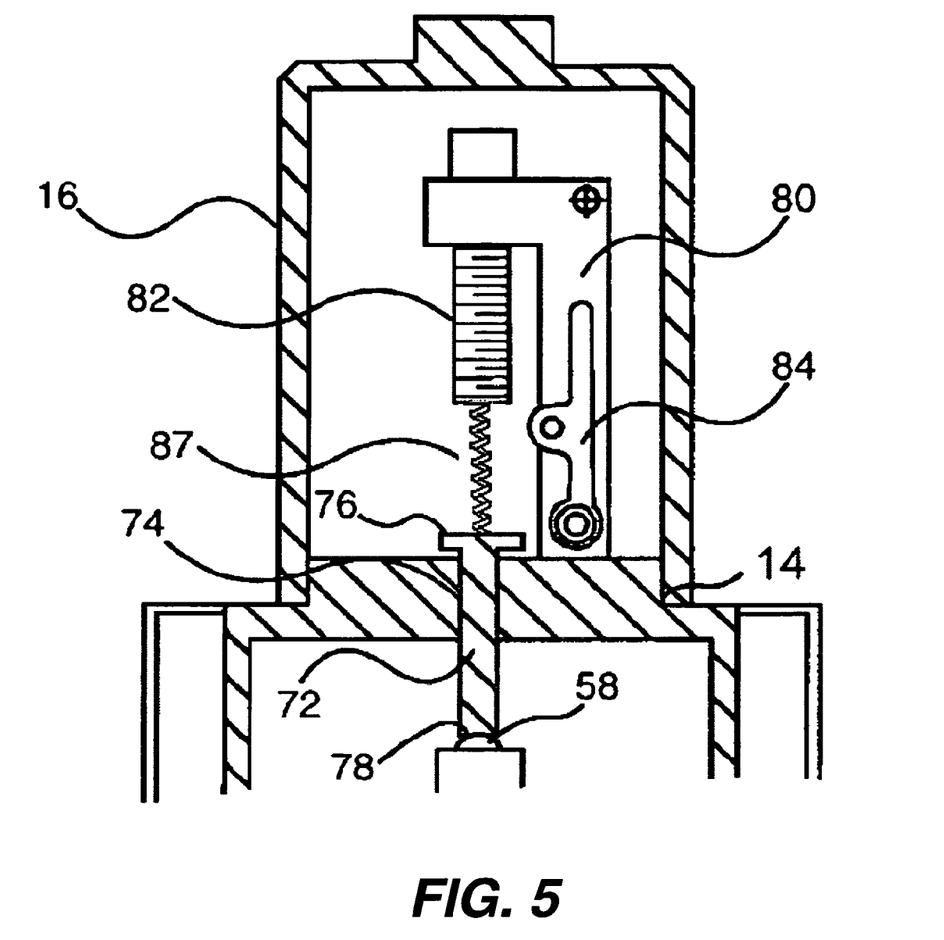
FIG. 5 is a cross-sectional view of a pressure relief device for a pressurized system according to an exemplary embodiment, illustrating a spring activation component.

For purposes of following description, the term "activation component" refers to any device configured to maintain a valve in a first configuration until a predetermined pressure is exerted on the valve or until a predetermined temperature is experienced whereupon the particular device will allow the valve to move to a second configuration. By way of non-limiting examples, activation components include pressure sensitive elements such as buckling pins, shear pins, tensile pins, springs 87 (see FIG. 5) and other equivalent structures. It is also contemplated that the activation component may include a temperature sensitive element such as fusible alloys and other equivalent structures. It is further contemplated that the activation component may reset automatically to allow the valve to return to the first configuration once the pressure exerted on the valve has been decreased below the predetermined pressure. Such an activation component may include a spring 87 as illustrated in FIG. 5.

Because activation components are designed to actuate at a predetermined parameter threshold, proper performance for a pressure relief device requires that the relief device vents at, or close to, the set pressure (or other desired parameter, such as for example, temperature). Therefore, it is important for the pressure relief system to assure/facilitate an efficient transfer of force from the pressurized system to the activation component.

During assembly and field installation of the pressure relief device 10, fluid flow path 44 is closed upon a sealing connection at mouth 62 of nozzle 48 through the following arrangement. Plate member 66 is positioned to seat within the opening 32 of downstream port interface 30, as described above. Valve plug 52 is positioned to close the flow path 44 through a sealing connection (such as, for example, the use of a rubber gasket at the outer perimeter at mouth 62) or through metal to metal connection between small polished flat surfaces on the valve plug 52 and the mouth 62. The remainder of the stem assembly 50 is positioned such that the protrusion member 58 at the opposite end of shaft 56 contacts the base surface 78 of piston pin 72. The components of pressure relief device 10 are dimensioned such that upon installation of stem assembly 50 and bonnet assembly 14, piston pin platform 76 is raised to extend above the top surface of the bonnet assembly enclosure 14. This arrangement provides a manufacturing benefit. Since the distance between adjuster screw 82 and the piston pin platform 76 is adjustable, the stem assembly 50 can be manufactured to fit a range of distances so long as upon proper installation of stem assembly 50, the piston pin platform 76 extends above the top surface of the bonnet assembly enclosure 14. Therefore the stem assembly 50 does not need to be manufactured according to particular unique dimensions and instead can be manufactured to fit a range of distances for an underlying pressure relief device.

Accordingly, upon (1) sealing engagement of the plate member 66 between main valve body 12 and bonnet assembly 14 and (2) when sealing valve plug 52 is positioned to close the flow path 44 (as seen in FIG. 2A), an activation component can then be installed as a load bearing member included in the transmission path of the output force generated by the pressurized system at valve plug 52.

Figure 2B:
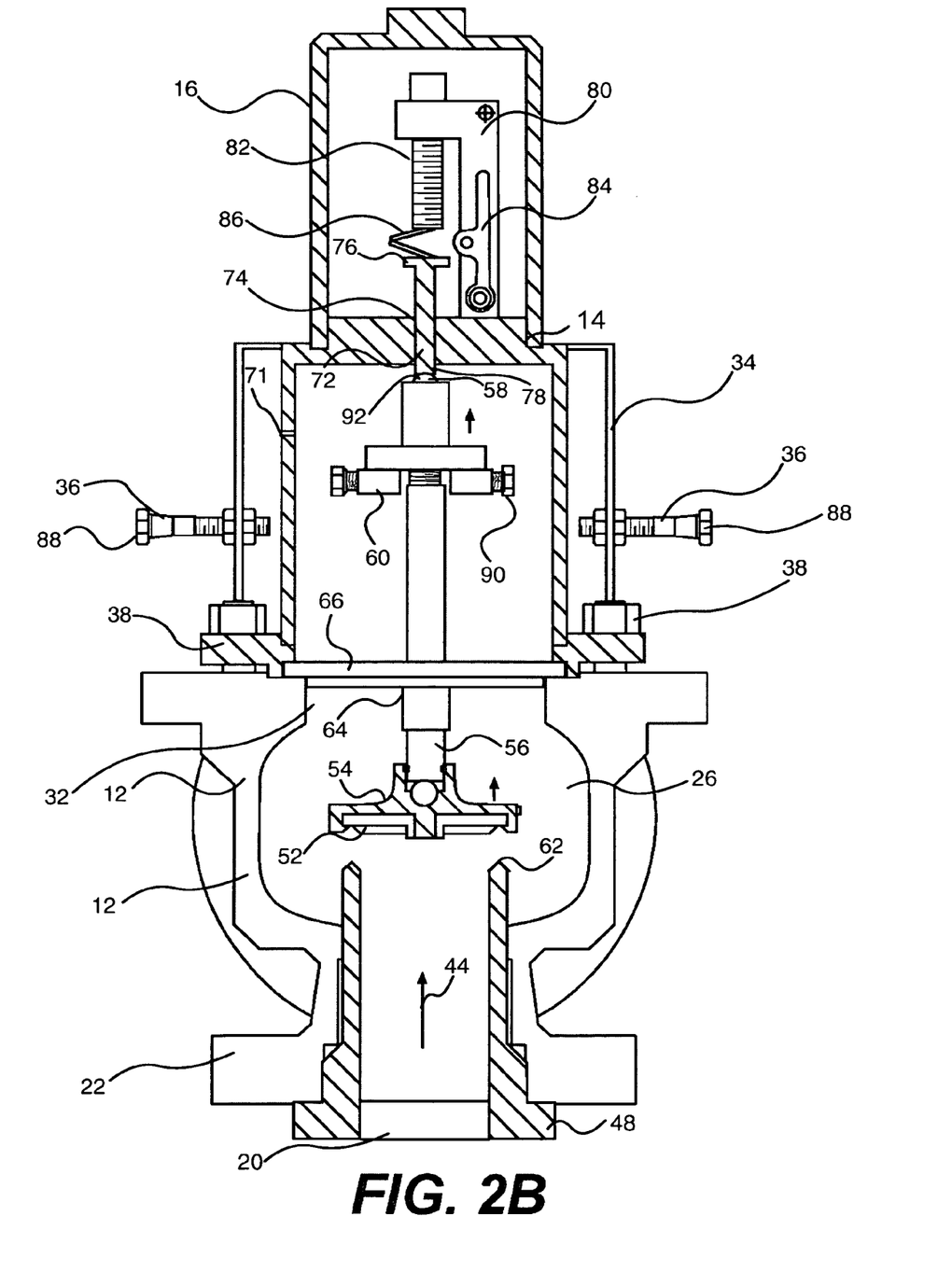
FIG. 2B is a general cross-sectional view of a pressure relief device for a pressurized system according to an exemplary embodiment illustrating a relieving of pressure from the system.

As seen in FIG. 2A, an activation component, such as buckling pin 86, is installed between adjuster screw 82 and piston pin platform 76, thereby experiencing an output force transmitted by the pressurized fluid system. Referring to FIG. 2B, when the output force exceeds the predetermined force of the buckling pin 86, the material of the buckling pin 86 will deform, or buckle. Upon the activation of buckling pin 86, the pressurized fluid of the underlying system can then vent (by unseating valve plug 52) through outlet port 26 to a safety reservoir, for example.

With reference to FIGS. 2A and 2B, pressure relief device 10 may include a sensor or sensor activating device 60 housed along shaft 56 of stem assembly 50. The sensor device 60 can be positioned to rest, upon proper installation, a predetermined axial distance relative to a corresponding position sensor 36 mounted along the axial sensor mount 34 at the exterior surface of the bonnet assembly 14. For example, the sensor 36 may comprise a magnetically activated proximity switch 88 and the sensor activating device 60 may include a permanent magnet 90. Upon the activation of buckling pin 86 due to an overpressure situation, the unseating of sealing valve plug 52 will result in axial displacement of the stem assembly 50, which in this case includes permanent magnet 90. In FIGS. 2A-2B, the axial movement of two magnets 90 will result in the activation of two proximity switches 88, thereby providing dual electronically signaling of the actuation of the underlying pressure relief device 10. The two sensors 88 and sensor activating devices 60 could be placed in different positions on shaft 56 to provide electronic signaling of different valve positions.

The use of a non-contact sensor, such as the above-mentioned magnets 90 and proximity switch 88 arrangement, is advantageous in that the sensor configuration does not contribute to any corruption of valve activation at a predetermined set pressure. For example, in low pressure situations (i.e. in a system where an "over-pressure" situation occurs at a relatively low pressure condition) corruption may result where sensor actuation requires that a force be overcome, such as in a dry contact switch or burst sensor arrangement. The use of a non-contact sensor therefore removes any potential for the actuation condition of the sensor to interfere with the predetermined activation condition of the pressure relief device. Accordingly, sensing of valve activation is more accurate. Alternative non-limiting examples of suitable non-contact sensors include hall-effect transducers and photo-detector/photo-emitter sensor arrangements.

The arrangement of the valve sealing interface of pressure relief device 10 provides an efficient transfer of output force between the valve plug 52 and buckling pin 86. Upon proper installation, the output force of the pressurized system directly acts upon the valve seal 52. From valve plug 52, force is transferred through gimballing joint 54, along force transmission shaft 56, and extends to protrusion member 58. Protrusion member 58 may be provided in the form of protruding ball bearing 92. Output force is then transferred to the buckling pin 86 through the point of contact between ball bearing 92 and base surface 78 of piston pin 72.

As noted above, in past valve systems, forces transferred to the buckling pin from the pressurized system are often poorly transmitted due to, bending, poor alignment of component parts, friction between moving parts, and moments generated along the path of transmitted force. For example, in a valve where output force is transferred to a buckling pin along a single, unitary shaft member extending through a bushing enclosure, output forces may be lost due to bending moments stored in the shaft, as well friction between the bushing and the shaft member during pin failure. This problem of improper force transfer is often exacerbated when the single shaft member and bushing enclosure are misaligned due to either differences in manufacturing tolerances and bending of the shaft member over time.

The inclusion of gimballing joint 54, which acts a universal ball joint connector, allows the force transmission shaft 56 to rotate a certain amount relative to the sealing plug 52. At the other end of stem assembly 50, ball bearing 92 provides a point contact for transferring force to the piston pin 72. The arrangement of gimballing joint 54, force transmission shaft 56, and ball bearing 92, provides the structural equivalent of a pin ended link, where no moment can be transferred along the connection. Since force transmission shaft 56 is free (within limits) to rotate relative the valve seal 52, no moment can be transferred therealong and therefore, only force coincident with the direction of the shaft 56 will be transmitted. In addition, since there is no direct connection (i.e., no positive engagement) between ball bearing 92 and the base surface 78 of piston pin 72, only the axial component (and, therefore, no lateral component) of force along shaft 56 can be transferred. Accordingly, in this arrangement there is no mechanical connection other than contact. This arrangement also allows easy removal of the stem assembly for resetting an activation component and maintenance.

Accordingly, the stem assembly 50 efficiently transfers the output force to the activation component, thereby assuring that pressure relief device more accurately opens at the predetermined pressure. While FIGS. 2A and 2B illustrate stem assembly 50 including a gimballing joint 54 and a ball bearing 92, the present invention should not be limited to this structure. Alternative arrangements include, but are not limited to, any transmission structure that prevents, or reduces the transfer of moments therealong.

Figure 2C:
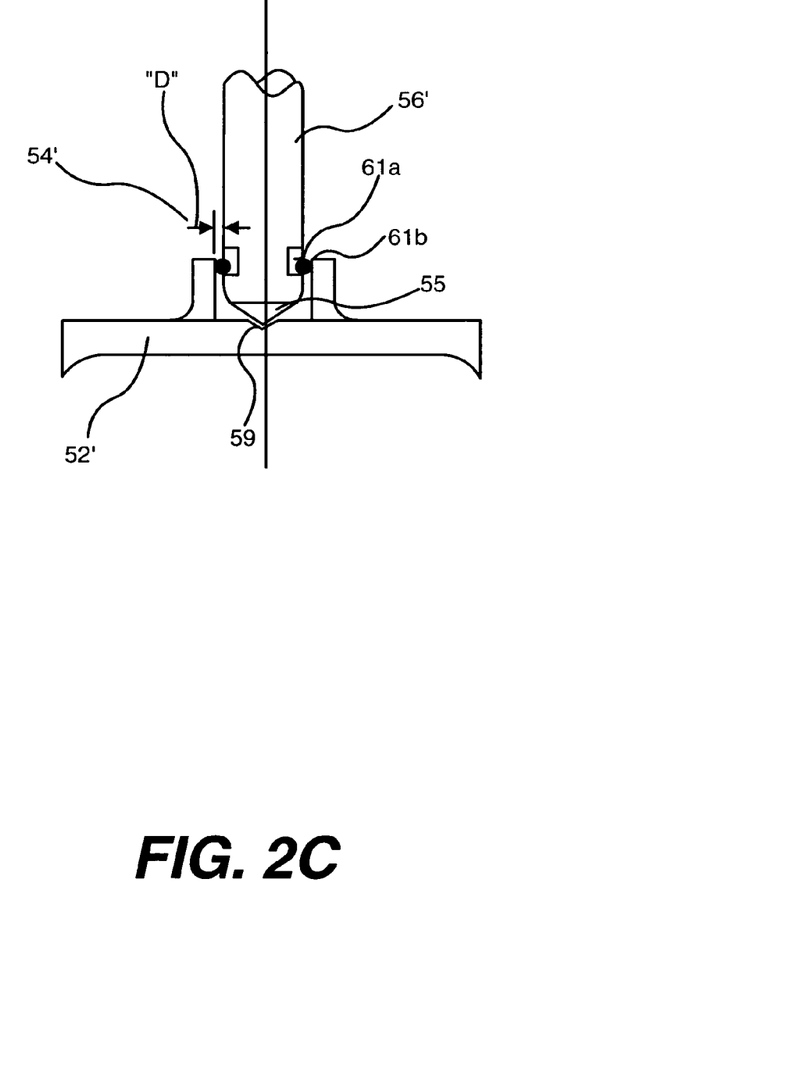
FIG. 2C illustrates an alternative arrangement for a component of the pressure relief device.

FIG. 2C, for example, illustrates an alternative arrangement for a joint 54'. Joint 54' includes a connection between valve plug 52' and the end of transmission shaft 56'. The end of shaft 56' can be rounded to a point or protrusion 55, which correspondingly engages and is seated within a recessed divet 59 formed in the upper surface of the valve plug 52'. A recess 61a can be formed at a position along the outside of the shaft 56'. A snap ring 61b fits within the recess 61a and provides a maximum distance "D" for movement between shaft 56' and the remainder of valve plug 52'. Just as in the embodiment described above, transmission shaft 56' is free (within limits) to rotate relative the valve plug 52'. Again, no moment can be transferred therealong and therefore, only force coincident with the direction of the shaft 56' will be transmitted. There is no mechanical connection (i.e., no positive engagement) between shaft 56' and valve plug 52'. Engagement is maintained solely due to the transmission of force from the pressurized system to the valve plug 52' and then through the shaft 56', which is free (within limits) to move within the recessed divet 59.

The capability of sealing plug 52 to rotate relative to the transmission shaft 56 also provides the additional benefit of allowing the valve plug 52 to sealingly close the flow path 44 at mouth 62 of nozzle 48 when the center of flow path 44 and shaft 56 are not perfectly aligned. As a result of these arrangements, the stem assembly 50 does not need to be manufactured according to particular unique dimensions. Instead, stem assembly 50 can be manufactured to fit a range of distances other than one where the valve plug 52 is perfectly aligned with the mouth 62 or the stem assembly 50 perfectly aligned with the mouth 62.

As noted above, the top surface of the bonnet assembly enclosure 14 includes a mounting block 80, which houses an adjuster screw 82 in opposed relation to the piston pin 72, and a pre-loading mechanism 84. In one embodiment, the pre-loading mechanism 84 comprises rotatable arm assembly 94. The use of a pre-loading feature for the buckling pin 84 is advantageous in that buckling pin 86 will not be subject to corrupting compression forces imparted from over-tightening of the adjuster screw 82 (or other corrupting handling forces). For example, in low pressure situations, corruption may result where a buckling pin 86 is overloaded during the initial installation process. The use of a pre-loading feature therefore removes any potential for improperly loading the pin 86 prior to the actual loading of the system by the pressurized fluid generated output force (as is intended).

Figure 3A:
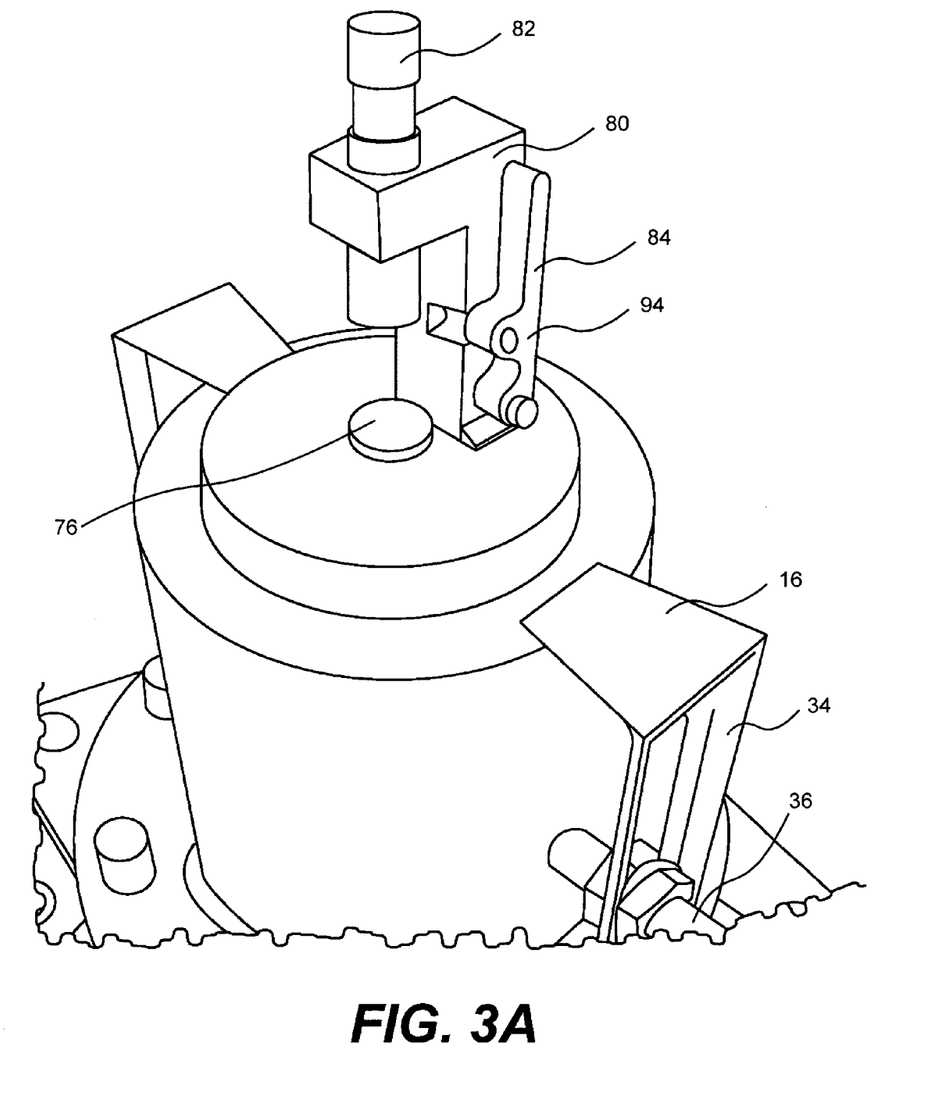
FIG. 3A illustrates a perspective view of an activation component installation location in a pressure relief device according to an exemplary embodiment.

FIG. 3A illustrates a perspective view of an activation component installation location in a pressure relief device 10 according to one exemplary embodiment. FIG. 3A illustrates a mounting block 80, which houses an adjuster screw 82 in opposed relation to the piston pin platform 76, and a pre-loading rotatable arm assembly 94. The upper face of piston pin platform 76 is configured to receive an activation component, such as, for example, a buckling pin 86. Preferably, adjuster screw 82 has a threaded shank portion and a pin seat hole. The pin seat hole receives and secures a buckling pin to adjuster screw 82. In addition, piston pin platform 76 also has a pin seat hole similar to the pin seat hole in adjuster screw for receiving the buckling pin 86. Alternatively, the activation component can be installed through the use of a cartridge assembly, or through any of the methods and arrangements described in U.S. Pat. No. 6,484,742, which is hereby incorporated by reference in its entirety.

Figure 3B:
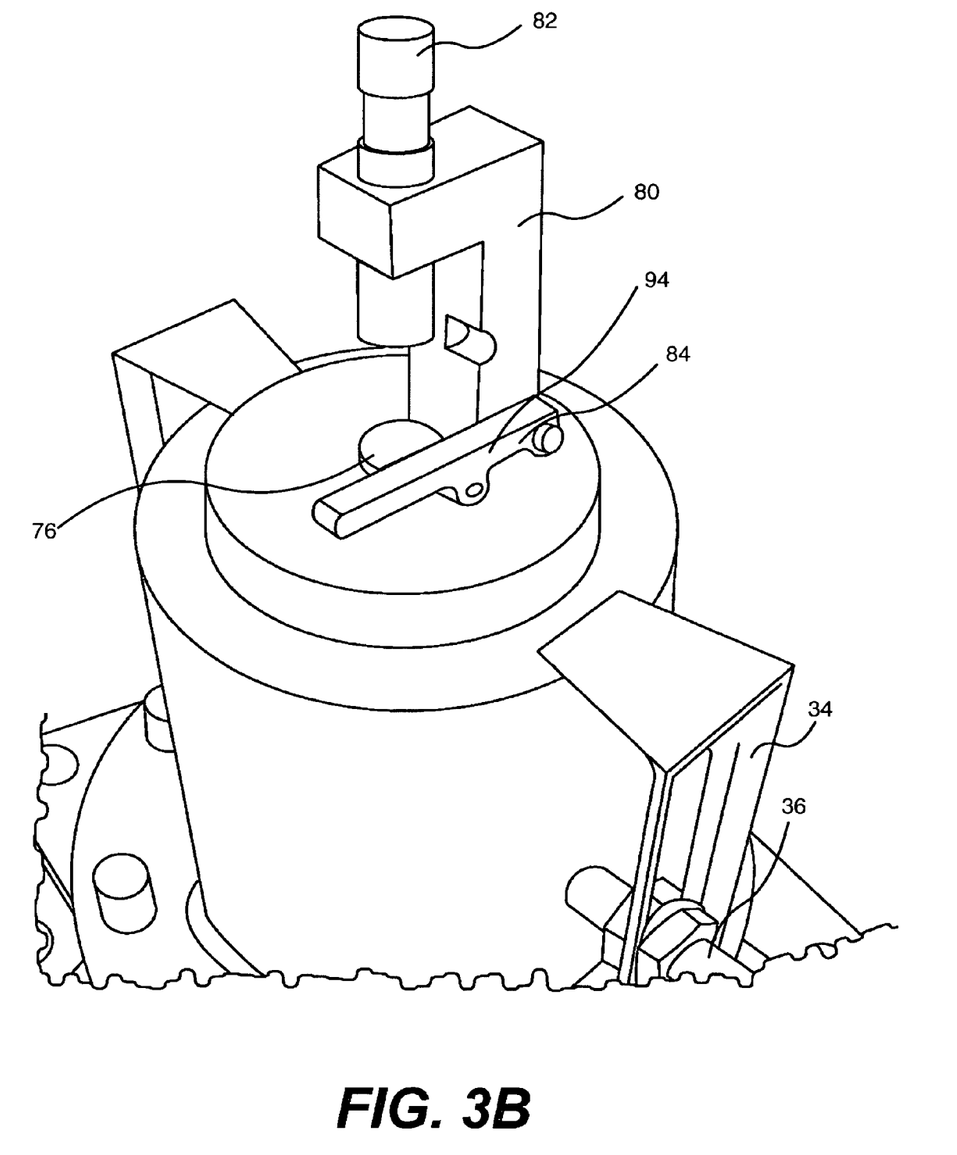
FIG. 3B illustrates another perspective view of an activation component installation location in a pressure relief device according to an exemplary embodiment.

As noted above, the components of pressure relief device 10 are dimensioned such that upon proper initial installation of stem assembly 50 and bonnet assembly 14, piston pin platform 76 is raised to extend above the top surface of the bonnet assembly enclosure 14. With reference to FIG. 3B, pre-loading of the piston pin 72 can thereby be achieved through the application of a pre-loading force through rotatable arm 94. Accordingly, the rotatable arm 94 prevents corruption and overloading of the activation component during installation. The description of rotatable arm 94 is intended to be a non-limiting example of a preloading feature. Alternative configurations include any structural mechanism configured to removably provide a sufficient load to piston pin platform 76 such that piston pin platform 76 maintains contact with protrusion member 58 prior to the installation of an activation component. Particularly where a soft valve seat is employed at the valve plug 52 or mouth 62, preloading ensures that the sealing arrangement is appropriately energized without risk of overloading the buckling pin 86.

Figure 4:
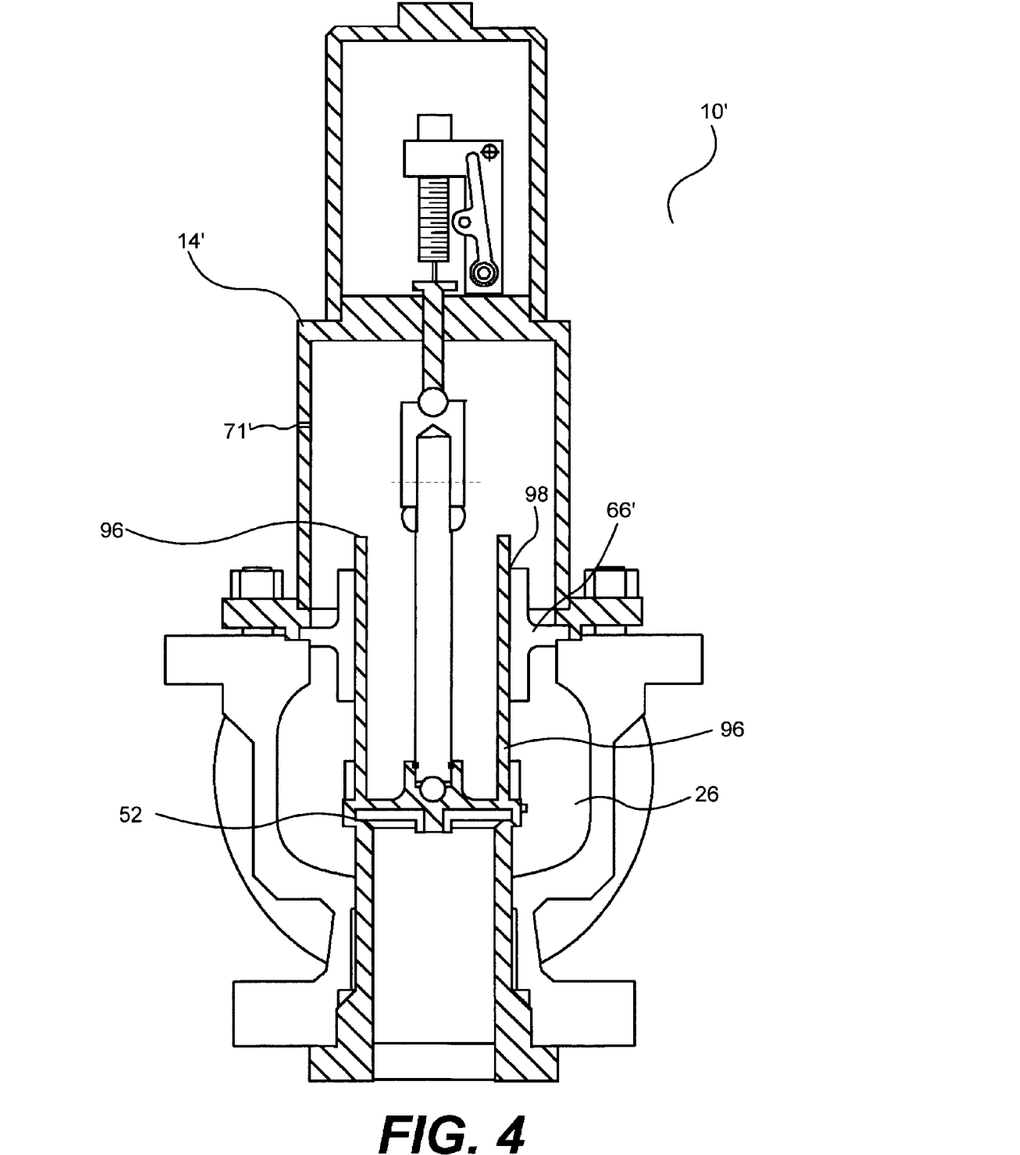
FIG. 4 is a cross-sectional view of a pressure relief device for a pressurized system according to an exemplary embodiment illustrating a device for preventing interference from backpressure.

Referring to FIG. 4, a cross-sectional view of a pressure relief device for a pressurized system according to an exemplary embodiment is illustrated. As noted above, in some situations the valve plug 52 can experience a back pressure from the direction of outlet port 26 and acting in a direction opposite the flow path 44. Many valves are applied in cases where the discharge line leading to a safety reservoir (or the environment), for example, carries multiple relief devices sequentially along the outlet discharge path. When one such relief device is relieving pressure, the others further upstream in the chain are subject to a level of back pressure. Any relief device that is sensitive to differential pressure can have its set point temporarily affected by such back pressures. Some pressure systems may even have a permanent back pressure that must be accounted for. In the design of pressure relief devices there is a need for technology that can function independent or somewhat independent of back pressure.

FIG. 4 illustrates an pressure relief device 10' similar to the pressure relief device 10 of FIG. 2A and including a feature for facilitating back pressure independence. In FIG. 4, plate member 66 and central through-bore/shaft bushing 64 of FIG. 2A is replaced with a seal plate 66' within which exhibits an enlarged central opening 98. An extended chimney 96 is provided which extends from the valve plug 52 and passes through the opening 98 in seal plate 66' between the main valve body 12' and the bonnet assembly 14'. A seal is provided between the components of the chimney's outer diameter and the inner surface of opening 98 in seal plate 66'. Accordingly, any back pressure from outlet port 26 cannot reach the backside of valve plug 52 because that path is sealed due to the presence of chimney 96. Any back pressure or vacuum from bonnet assembly 14', for example, that induced by temperature change can be safely vented without interference with valve plug 52 through one or more apertures 71' in the bonnet assembly 14'.

The difference in area between the inlet of plug 52 and the chimney 96 cross section determines the load transmitted through the stem assembly 50. If the chimney 96 cross sectional area equates to the inlet area of the valve plug 52, the influence of back pressure on the load transmitted through the stem assembly 50 is zero, making the set pressure of the valve independent of back pressure. For a low pressure device, even the changes in pressure within a sealed bonnet assembly 14 due to change in ambient temperature can corrupt the set pressure of the valve.

Figure 6:
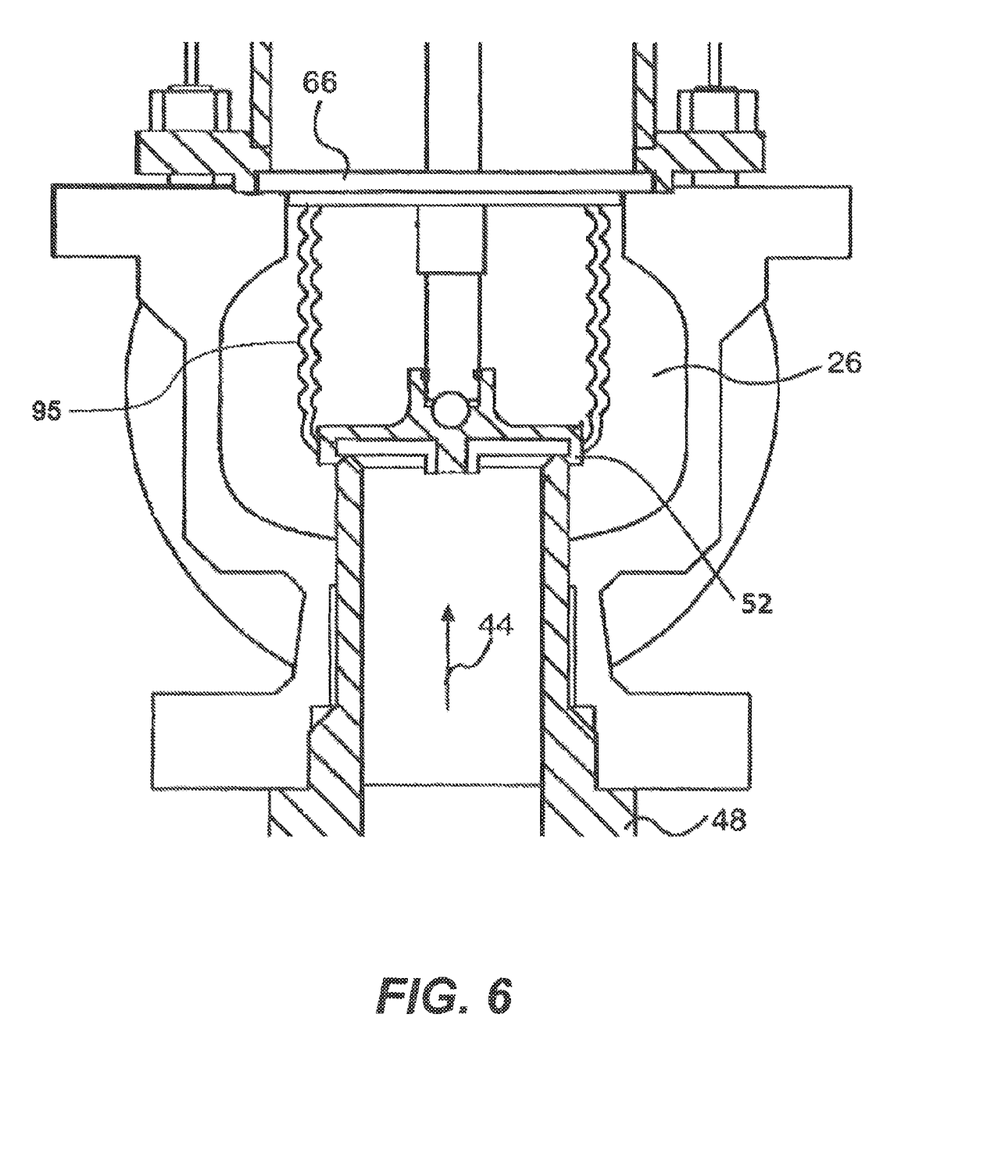
FIG. 6 is a cross-sectional view of a pressure relief device for a pressurized system according to an exemplary embodiment, illustrating a device for preventing interference from backpressure including a bellows.

As an addition, or as an alternative, to the above-described elements for addressing system back pressure, a bellows 95 can be provided extending from the valve plug 52 as shown in FIG. 6. The bellows 95 is provided and configured to prevent back pressure from reaching the downstream side of the valve plug through the outlet port. In addition, the valve plug itself may extend through the main body into the valve bonnet 14' preventing back pressure from reaching the downstream side of the valve plug through the outlet port. In such an embodiment, the plug may be formed to exhibit a cylindrical shape extending through the main valve body.

With regard to the foregoing description of exemplary embodiments, it is noted that, while a 90 degree angle is illustrated in the figures, this representation is considered to be non-limiting and alterative flow paths could be provided without departing from the scope of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A pressure relief device for a system containing a pressurized fluid, comprising;
   a main valve body including an axial passageway defining an inlet port, an outlet port, and a fluid flowpath between the inlet and outlet ports;
   a valve plug positioned to seal the inlet port of the main valve body;
   a force transmission component connected to the valve plug, the force transmission component comprising a curved protrusion member;
   an activation component installed between the protrusion member and a mounting surface, the activation component configured to prevent axial movement of the valve until a predetermined pressure is exerted on the valve; and
   a piston slidably housed within the relief device between the protrusion member and the activation component, the piston having a first end and a second end, wherein the first end and second end are exposed to environmental pressure;
   wherein the force transmission component only transfers an axial force acting on the valve plug to the activation component through the curved protrusion member and piston.

2. The device of claim 1, wherein the axial passageway terminates within the main valve body at a mouth within the main valve body.

3. The device of claim 2, wherein the valve plug comprises a disk shaped valve seat providing a seal at the mouth.

4. The device of claim 2, wherein the valve plug comprises a component sealingly engaged within the axial passageway downstream of the mouth.

5. The device of claim 1, wherein the valve plug comprises a single plate valve plug.

6. The device of claim 1, wherein the activation component is a buckling pin configured to buckle when the pressurized fluid of the system reaches the predetermined pressure.

7. The device of claim 1, wherein the activation component is a pin configured to break when the pressurized fluid of the system reaches the predetermined pressure.

8. The device of claim 1, wherein the distance between the mounting surface and the piston is adjustable to accommodate installation of the activation component.

9. The device of claim 1, wherein the piston and force transmission component are dimensioned such that when the valve plug is positioned to seal the inlet port, the force transmission component is positioned to slidably displace the piston.

10. The device of claim 1, further comprising a pre-loading mechanism configured to axially load the force transmission component such that the valve plug is positioned to seal the inlet port prior to the installation of the activation component.

11. The device of claim 10, wherein the pre-loading mechanism comprises a rotatable arm.

12. The device of claim 1, wherein the force transmission component includes at least one gimballing joint.

13. The device of claim 12, wherein the at least one gimballing joint is connected to the valve plug.

14. The device of claim 1, wherein the force transmission component further comprises a gimballing joint connected to the valve plug and a shaft extending between the gimballing joint and the protrusion member.

15. The device of claim 14, wherein the protrusion member comprises a ball bearing.

16. The device of claim 1, further comprising a sensor activating device positioned along the force transmission component and a sensor fixed relative to the main valve body configured to monitor axial movement of the sensor activating device and the force transmission device.

17. The device of claim 1, further comprising a plurality of sensor activating devices positioned along the force transmission component and a plurality of sensors fixed relative to the main valve body configured to monitor several axial positions of the force transmission device.

18. The device of claim 1, wherein the outlet port exits the main valve body at an angle approximately 90 degrees relative to the axial passageway.

19. The device of claim 1, wherein a chimney extending from the valve plug prevents back pressure from reaching the valve plug downstream side through the outlet port.

20. The device of claim 1, wherein a bellows extends from the valve plug and prevents back pressure from reaching a downstream side of the valve plug through the outlet port.

21. The device of claim 1, wherein the valve plug extends through the main valve body beyond the axial passageway such that the valve plug prevents back pressure from reaching a downstream side of the valve plug through the outlet port.

22. A pressure relief device for a system containing a pressurized fluid, comprising;
   a main valve body including an axial passageway defining an inlet port, an outlet port, and a fluid flowpath between the inlet and outlet ports;
   a valve plug positioned to seal the inlet port of the main valve body;
   a force transmission component connected to the valve plug;
   a protrusion member connected to the force transmission component, the protrusion member comprising a curved surface;
   a piston having a base surface and a pin platform, the base surface being configured to contact the protrusion member, wherein the piston is constrained from moving in a non-axial direction by a single cylinder having a uniform diameter;
   an activation component having a first end and a second end, the first end being engaged with a mounting surface, the second end being engaged with the pin platform, the activation component configured to prevent axial movement of the valve plug until a predetermined pressure is exerted on the valve plug; and
   wherein the force transmission component is incapable of transferring through the protrusion member any moment resulting from the output force acting on the valve plug to the activation component.

23. The device of claim 22, wherein the force transmission component comprises a gimballing joint connected to the valve plug and a shaft extending between the gimballing joint and the protrusion member.

24. The device of claim 22, wherein the axial passageway terminates within the main valve body at a mouth within the main valve body.

25. The device of claim 24, wherein the valve plug comprises a disk shaped valve seat providing a seal at the mouth.

26. The device of claim 24, wherein the valve plug is sealingly engaged within the axial passageway downstream of the mouth.

27. The device of claim 22, wherein the valve plug comprises a single plate valve plug.

28. The device of claim 22, wherein the activation component is a buckling pin configured to buckle when the pressurized fluid of the system reaches the predetermined pressure.

29. The device of claim 22, wherein the activation component is a spring configured to compress when the pressurized fluid of the system reaches the predetermined pressure.

30. The device of claim 22, wherein the distance between the mounting surface and the piston is adjustable to accommodate installation of the activation component.

31. The device of claim 22, further comprising a pre-loading mechanism configured to axially load the force transmission component such that the valve plug is positioned to seal the inlet port prior to the installation of the activation component between the force transmission component and the mounting surface.

32. The device of claim 31, wherein the pre-loading mechanism comprises a rotatable arm.

33. The device of claim 22, further comprising a sensor activation device positioned along the force transmission component and a sensor fixed relative to the main valve body configured to monitor axial movement of the sensor activation device and the force transmission device.

34. The device of claim 33, wherein the sensor activation device comprises a magnet and the sensor comprises a proximity switch.

35. The device of claim 33, wherein the sensor is integral to or connected to a wireless transmitter.

36. The device of claim 22, further comprising a plurality of sensor activating devices positioned along the force transmission component and a plurality of sensors fixed relative to the main valve body configured to monitor several axial positions of the force transmission device.

37. The device of claim 22, wherein a chimney extending from the valve plug prevents back pressure from reaching the valve plug downstream side through the outlet port.

38. The device of claim 22, wherein a bellows extends from the valve plug and prevents back pressure from reaching a downstream side of the valve plug through the outlet port.

39. The device of claim 22, wherein the valve plug extends through the main valve body beyond the axial passageway such that the valve plug prevents back pressure from reaching a downstream side of the valve plug through the outlet port.

40. A method of installing a pressure relief device for a system containing a pressurized fluid, comprising;
providing a main valve body including an axial passageway defining an inlet port, an outlet port, and a fluid flowpath between the inlet and outlet ports;
providing a valve plug, a force transmission component connected to the valve plug, a piston, a mounting surface, and an activation component, the force transmission component having a spherical protrusion;
positioning the valve plug to seal the inlet port of the main valve body;
installing the force transmission component such that only an axial component of output force acting on the valve plug can be transferred therealong;
installing the piston in contact with the spherical protrusion, wherein the piston has a first end and a second end exposed to atmospheric pressure; and
installing an activation component between the piston and the mounting surface such that the activation component is configured to prevent axial movement of the valve plug until a predetermined pressure is exerted on the valve plug.

41. The method of claim 40, further comprising prior to installing an activation component, pre-loading an axial force to the force transmission component such that the valve plug is positioned to seal the inlet port prior to the installation of the activation component between the force transmission component and the mounting surface.

42. The method of claim 40, further comprising installing the force transmission component such that the force transmission component is incapable of transferring any moment resulting from the output force acting on the valve plug to the activation component.

43. The method of claim 40, wherein positioning the valve plug further comprises preventing back pressure from reaching the valve plug through the outlet port by providing a chimney extending from the valve plug beyond the axial passageway.

44. The method of claim 40, wherein positioning the valve plug further comprises preventing back pressure from reaching the valve plug through the outlet port by providing a bellows extending from the valve plug beyond the axial passageway.

45. The method of claim 40, wherein positioning the valve plug further comprises preventing back pressure from reaching the valve plug through the outlet port by having an extended valve plug that extends beyond the axial passageway.

46. The method of claim 40, wherein providing a force transmission component comprises providing a gimballing joint connected to the valve plug and a shaft extending between the gimballing joint and the protrusion.

* * * * *